(12) United States Patent
Utz et al.

(10) Patent No.: US 7,377,257 B2
(45) Date of Patent: May 27, 2008

(54) ADJUSTING DEVICE

(75) Inventors: Udo Utz, Ditzingen (DE); Ralf Kromer, Vaihingen (DE); Michael Knorpp, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 112 days.

(21) Appl. No.: 11/515,887

(22) Filed: Sep. 6, 2006

(65) Prior Publication Data
US 2007/0051337 A1 Mar. 8, 2007

(30) Foreign Application Priority Data
Sep. 6, 2005 (DE) .................. 10 2005 042 201

(51) Int. Cl.
*F02D 41/14* (2006.01)
(52) U.S. Cl. ........................ 123/337; 74/395
(58) Field of Classification Search ............. 123/337, 123/200; 74/6, 395
See application file for complete search history.

(56) References Cited

U.S. PATENT DOCUMENTS 5,067,933 A * 11/1991 Hardesty et al. ............. 475/32
5,672,818 A * 9/1997 Schaefer et al. ........... 73/118.2
2006/0288807 A1* 12/2006 Liu ................................ 74/6

* cited by examiner

*Primary Examiner*—Hieu T Vo
(74) *Attorney, Agent, or Firm*—Ronald E. Greigg (57) ABSTRACT

In an adjusting device with a transmission, high gear ratios are frequently required. In the transmission, powerful lateral forces are frequently generated, which must be absorbed by correspondingly dimensioned bearings. The present invention proposes an adjusting device having a transmission in which at least one gear is supported on an axle with a diameter that varies in the longitudinal direction. This achieves a uniform material loading of the axle supporting the gear and permits the diameter of the axle as a whole to be significantly reduced. The adjusting device is particularly intended for motor vehicles with an internal combustion engine.

20 Claims, 10 Drawing Sheets

ADJUSTING DEVICE

CROSS REFERENCE TO RELATED APPLICATIONS

This application is based on German Patent Application 10 2005 042 201.2 filed Sep. 6, 2005, upon which priority is claimed.

BACKGROUND OF THE INVENTION

1. Field of the Invention

The invention is directed to an improved adjusting device for adjusting the position of a final control element using a transmission.

2. Description of the Prior Art

There are known adjusting devices for internal combustion engines in which a servomotor must move a final control element via a transmission. For example, the final control element is a throttle valve flap. Because there is frequently very little room available for the adjusting device in a motor vehicle, it is necessary to keep its size to a minimum. In order for a relatively small servomotor to be able to move the final control element quickly and precisely, a transmission is provided between the servomotor and the final control element. Due to the limited amount of available space, the transmission must be as small as possible.

DE 195 25 510 A1 and U.S. Pat. No. 5,672,818 have disclosed an adjusting device provided in the intake manifold of an internal combustion engine. The adjusting device disclosed therein has a throttle valve shaft that is supported in a throttle valve housing in pivoting fashion and has a throttle valve flap attached to it. The throttle valve housing has a gas duct passing through it. The throttle valve flap opens or closes the gas duct in response to the pivoting of the throttle valve shaft. A servomotor can move the throttle valve flap via a transmission. The transmission is situated in a transmission housing and has a number of gears. A middle gear is supported in rotary fashion on an axle that is attached to the main body of the throttle valve housing. The transmission housing is covered by a cover. Because the cover has, among other things, parts of a position sensor attached to it, the cover must be positioned very precisely in the region of the position sensor. For this reason and due to production tolerances that can never be entirely avoided, there is necessarily play, particularly in the radial direction, in the region between the cover and the end of the axle oriented toward the cover. For this reason, the axle can only be secured in the region of the main body, whereas in the region of the cover, it is only possible for it to be supported loosely, with a large amount of play. This has the disadvantage that the axle, particularly at the point at which the axle comes out of the main body, is loaded with a large amount of bending stresses and shearing stresses and that a particularly high-strength material must therefore be used for the axle or else the axle would have to be so thick that it would require the entire device to be unnecessarily large.

OBJECT AND SUMMARY OF THE INVENTION

The adjusting device according to the invention has the advantage over the prior art that due to the varying diameter of the axle supporting the gear, the material used for the axle can be put to optimum use because a relatively uniform flow of stress is produced in the entire axle.

Advantageous modifications and improvements of the adjusting device are disclosed. If the axle becomes smaller in diameter as the distance from the main body increases, then this has the advantage that the gear can be attached to the axle very easily.

If the change in the axle diameter is achieved by means of steps, then this can yield cylindrical regions of the axle, which is good for supporting the gear in order to avoid forces in the axial direction.

If a sleeve is provided in at least subregions of the support of the gear, then this offers advantages with regard to the support, particularly with regard to reduced wear.

If the sleeve is provided in the smaller diameter region of the axle, then this has the advantage of an improved support, particularly in places where powerful surface pressures occur.

The at least one raised area on the axle offers the advantage that the sleeve can very easily be press-fitted onto the axle without requiring much material to be deformed, which is advantageous when selecting which material to use. Another advantage is that the raised area causes an elastic deformation to occur in the sleeve, which assures a long-lasting, advantageous initial stress between the sleeve and the axle. Another advantage is that this does not require such strict tolerances to be kept.

The molding device between the axle and the cover offers the advantage that the axle is optimally secured at the cover end as well. This offers the advantage that the axle as a whole can be embodied as thinner.

The relatively hard stamping body of the molding device offers the advantage that the molding can be very easily produced while the cover is being attached to the main body for mounting the axle to the side of the cover.

If the stamping body is comprised of the sleeve, which can also be used to mount the gear, then this offers the advantage of not requiring an additional component for the molding device.

BRIEF DESCRIPTION OF THE DRAWINGS

The invention will be better understood and further objects and advantages thereof will become more apparent from the ensuing detailed description of preferred embodiments, taken in conjunction with the drawings, in which.

DESCRIPTION OF THE PREFERRED EMBODIMENTS

The adjusting device according to the present invention can be used at various locations in internal combustion engines, in particular for controlling a passage through a gas duct. The gas duct is provided, for example, for a flow of air or a fuel/air mixture or for controlling exhaust, etc. The flow of the gas is throttled to a greater or lesser degree as a function of the pivot position of the throttle valve flap.

Normally, the throttle valve flap can be pivoted by up to 90°. There are, however, also embodiments in which the throttle valve flap can be pivoted by less than 90° or more than 90°, for example up to 180°. The throttle valve shaft with the throttle valve flap can be pivoted, for example, with the aid of a servomotor. For example, the servomotor engages the throttle valve shaft via at least one gear.

In all of the drawing figures, parts that are the same or function in the same manner are provided with the same reference numerals. Provided that nothing to the contrary is mentioned or is depicted in the drawings, that which is mentioned and depicted in conjunction with one of the figures also applies to the other figures. Provided that nothing to the contrary is stated in the explanations, the various details can be combined with one another.

Figure 1:
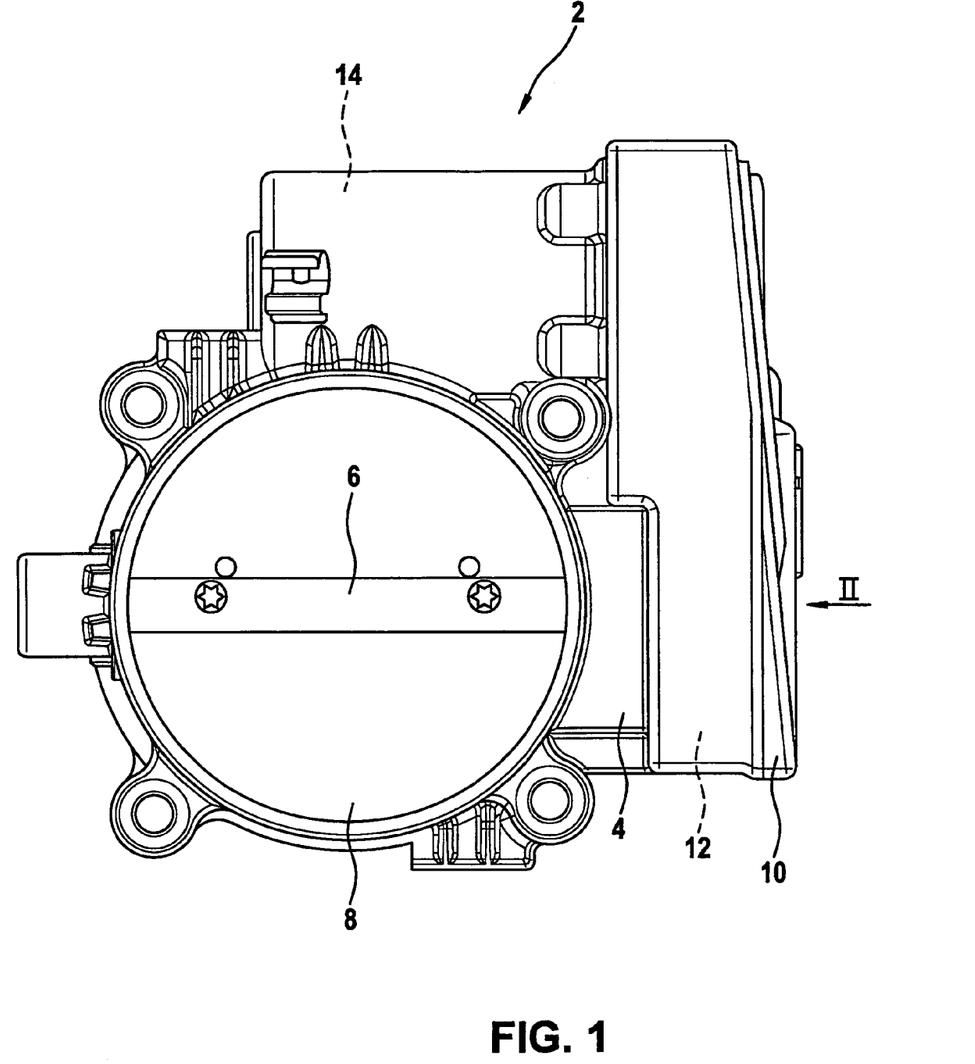
FIG. 1 is a top view of an adjusting device embodying the invention.

FIG. 1 shows an adjusting device 2 with a main body 4, a throttle valve shaft 6, a throttle valve flap 8, and a cover 10. The adjusting device 2 contains a transmission housing 12. The transmission housing 12 is encompassed by the main body 4, the side walls of the main body 4, and the cover 10. The main body 4 also contains a servomotor 14. Because the transmission housing 12 and the servomotor 14 are obscured by the main body 4 and the cover 10 in FIG. 1 and are therefore not directly visible, the reference lines of the reference numerals 12 and 14 are depicted in dashed form.

The transmission housing 12 contains a transmission 16 (FIG. 2) with a motor pinion 18, a drive gear 20, and a driven gear 22. Because the motor pinion 18 and the driven gear 22 are obscured by the cover 10 in the viewing direction selected for FIG. 2, these parts are depicted with dashed lines in FIG. 2.

During the manufacture of the adjusting device 2, after the servomotor 14 and the transmission 16 have been installed, the cover 10 is attached to the main body 4. When fully assembled, the circumference of the cover 10 is welded, glued, or clamped to the main body 4.

Figure 2:
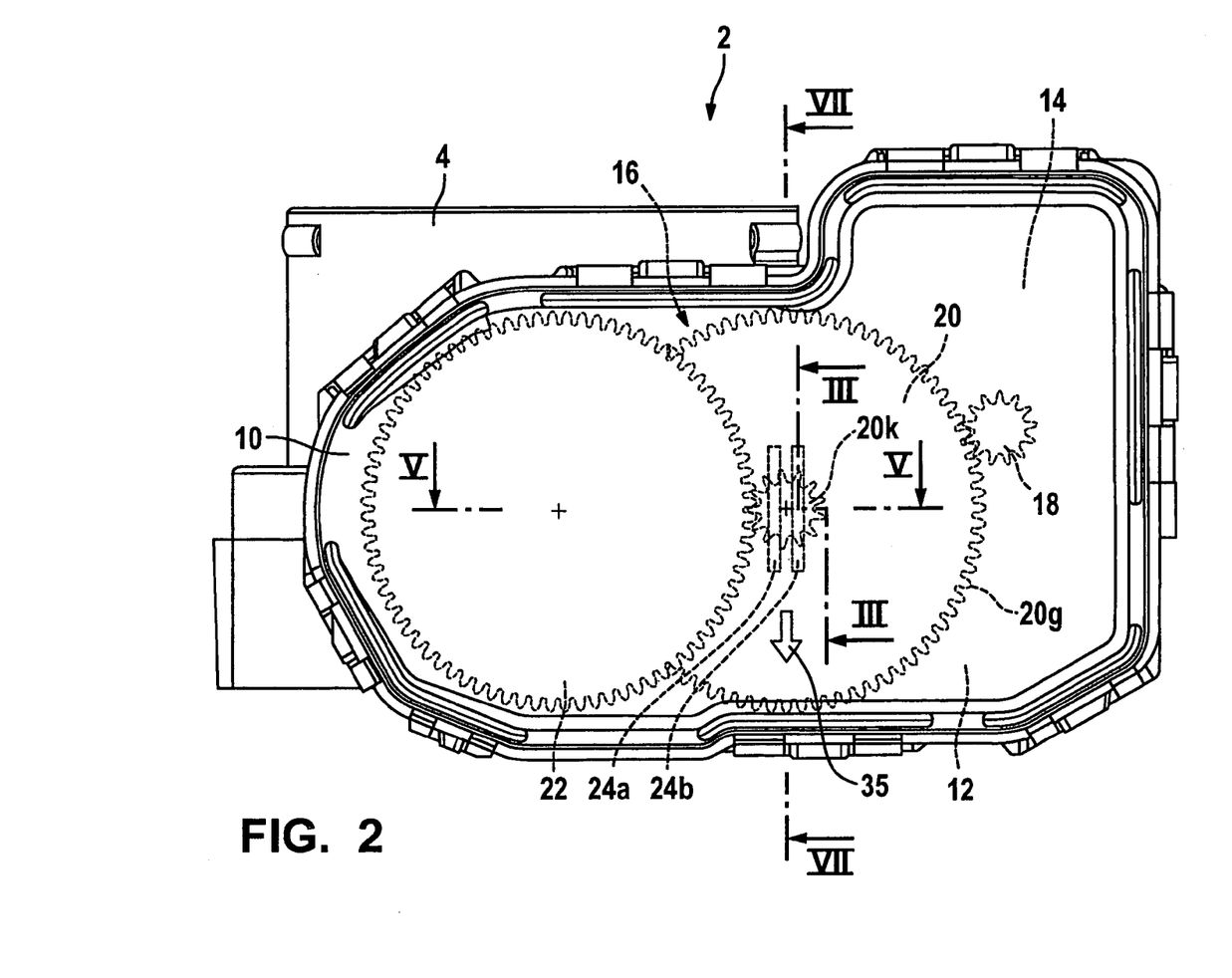
FIG. 2 is a side view of the adjusting device of FIG. 1.

The cover 10 is provided with a first rib 24a and a second rib 24b (FIG. 2). Because the ribs 24a and 24b are situated on the side of the cover 10 oriented away from the viewer, the ribs 24a and 24b are depicted with dashed lines in FIG. 2.

Figure 3:
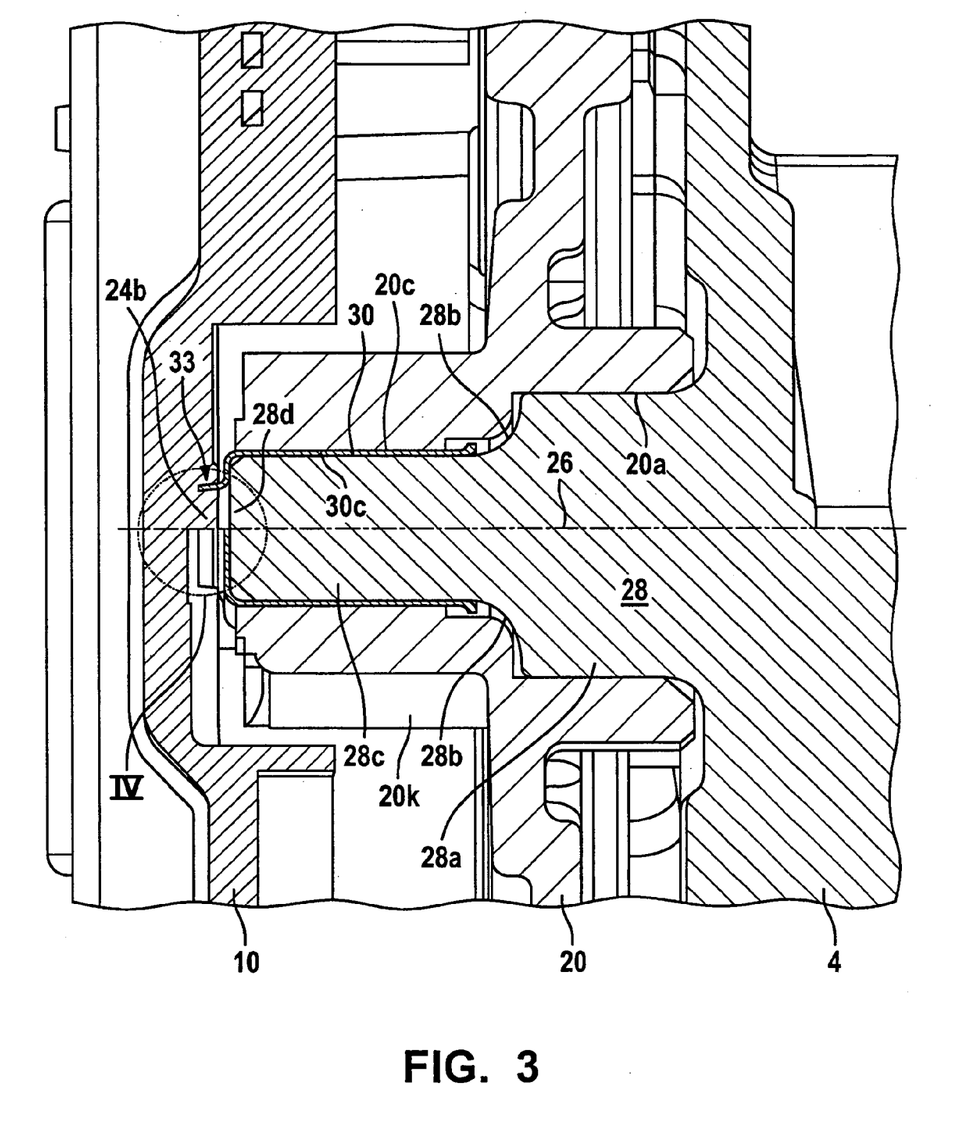
FIG. 3 shows a section through the adjusting device.
Figure 4:
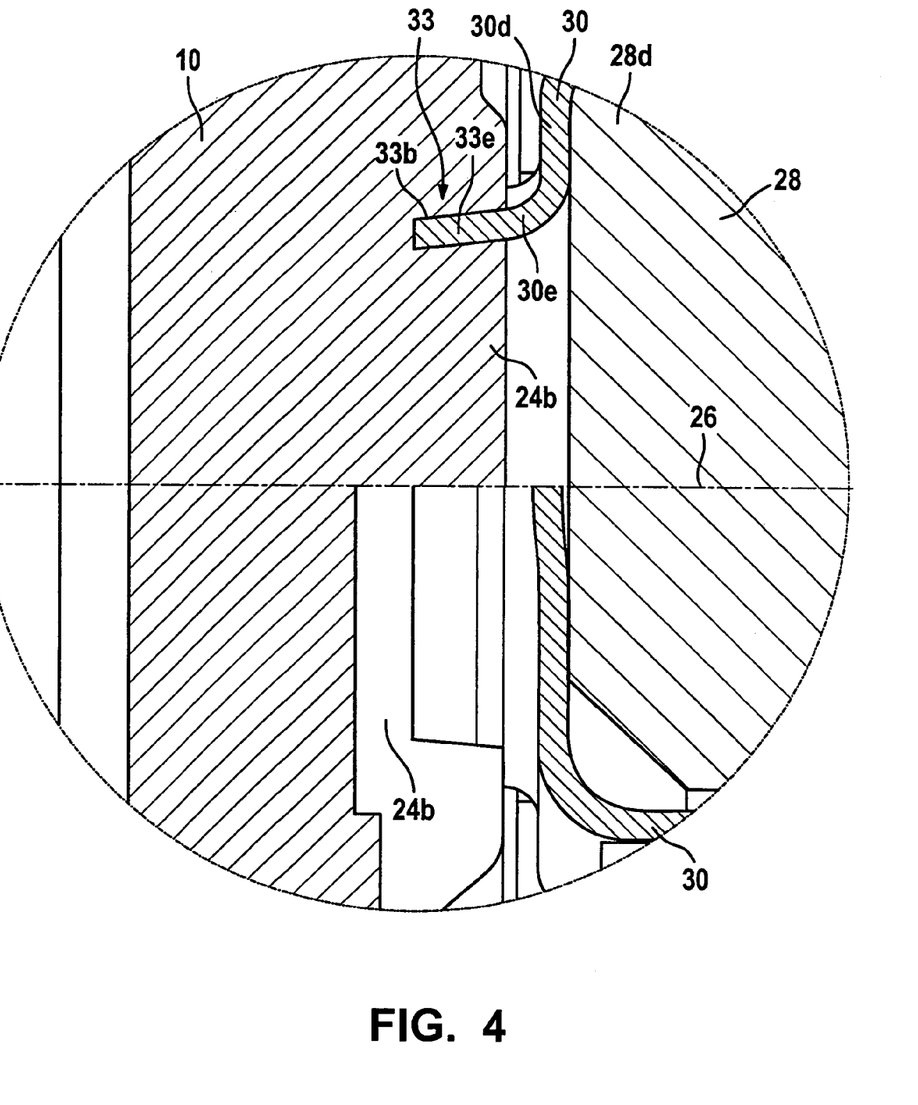
FIG. 4 shows a detail from FIG. 3.
Figure 5:
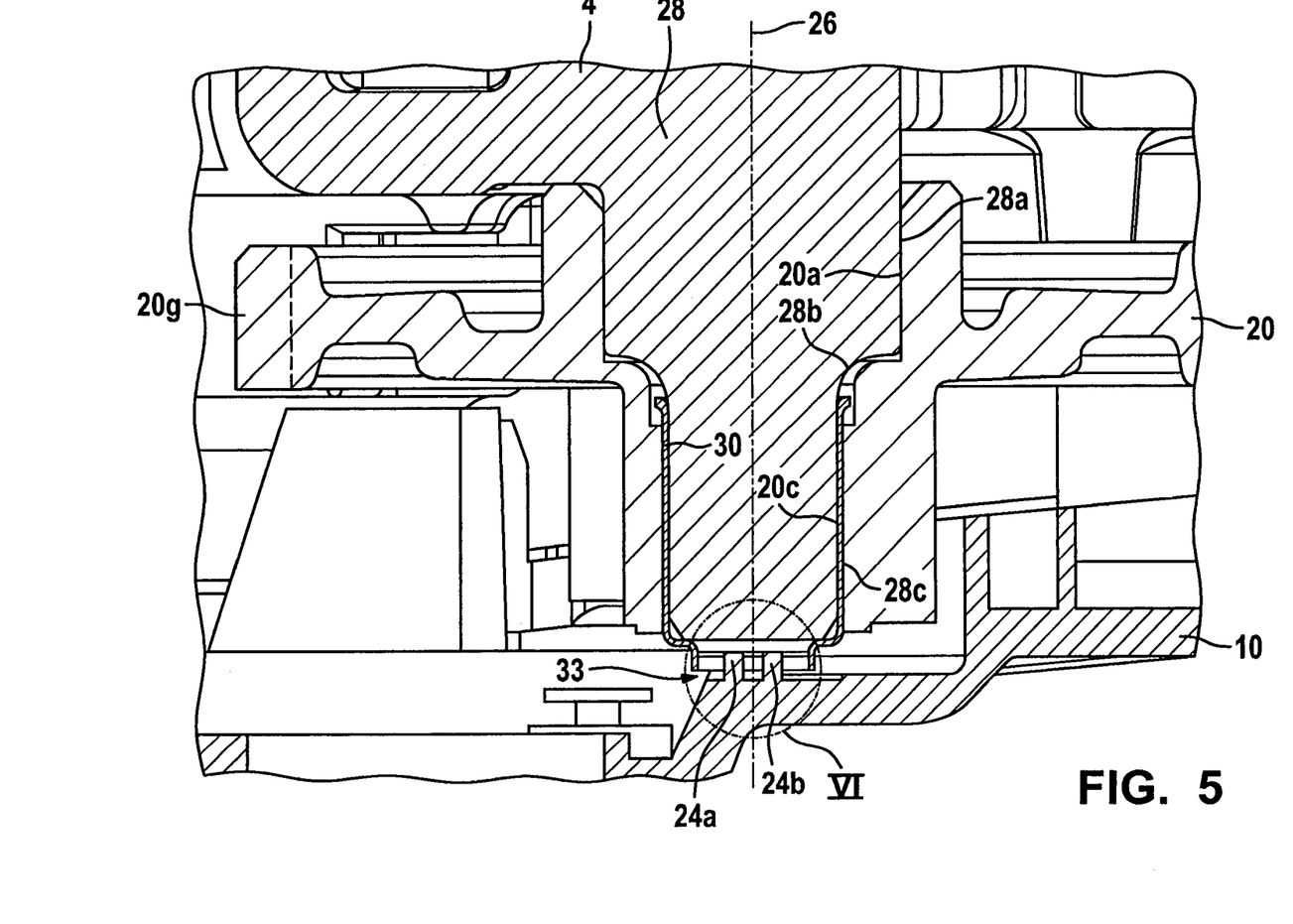
FIG. 5 shows a second section through the adjusting device.
Figure 6:
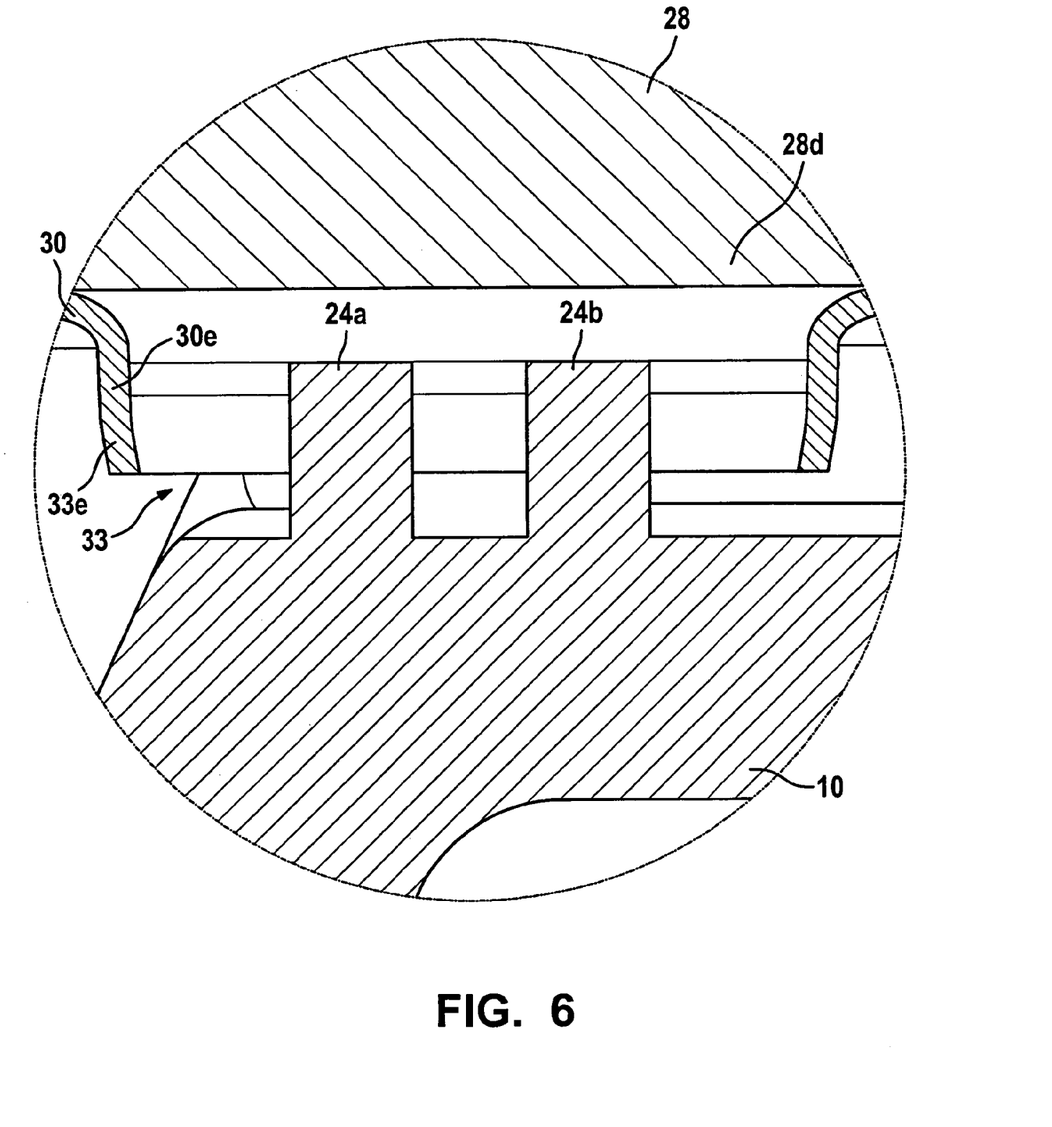
FIG. 6 shows a detail from FIG. 5.
Figure 7:
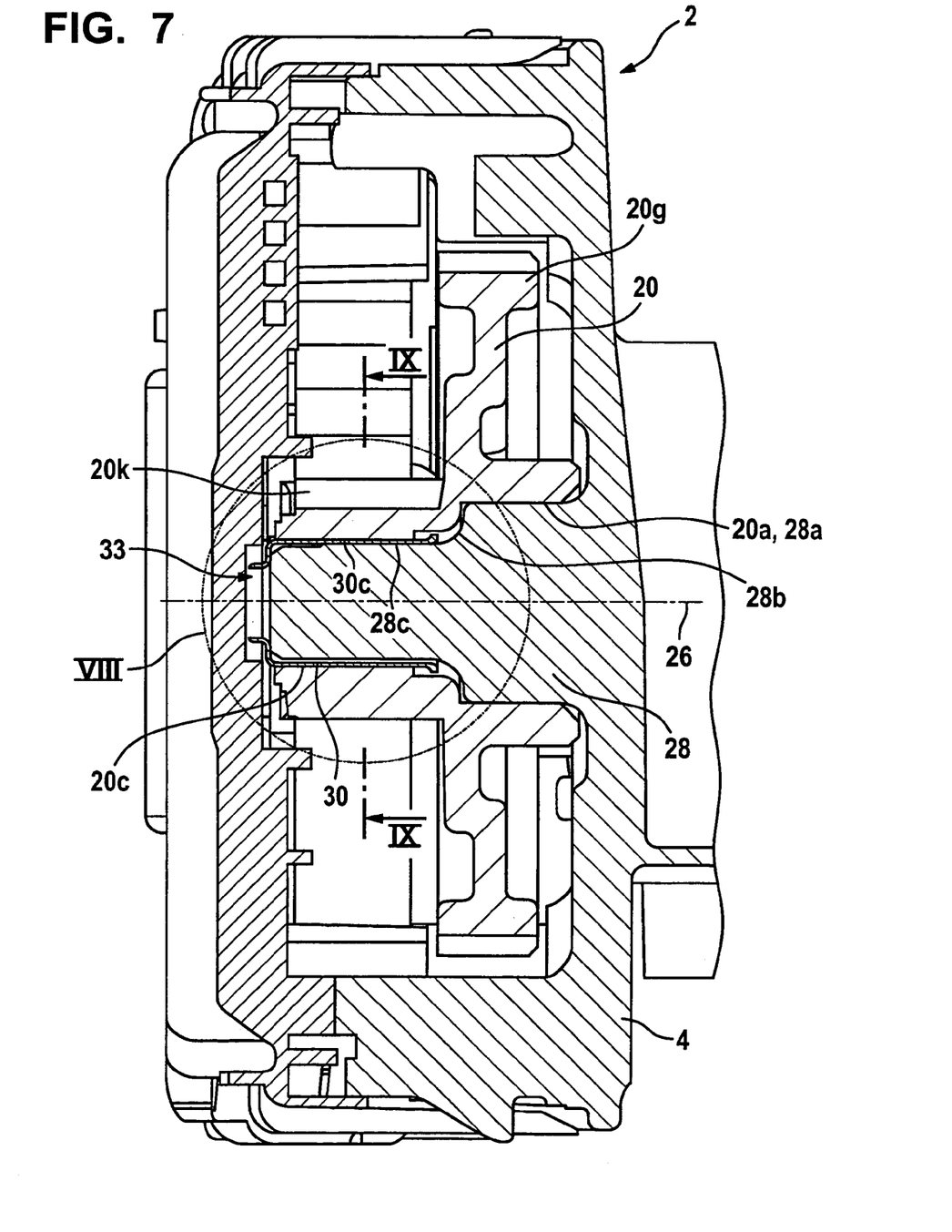
FIG. 7 shows another section through the adjusting device.

An axle 28 is formed onto the main body 4 (FIGS. 3, 5, 7). In the preferably selected, particularly advantageous exemplary embodiment, the main body 4 and the axle 28 are molded from the same plastic, for example by means of injection molding. The axle 28, however, can also be made of a separate material that is attached to the main body 4, for example by means of a press fit. Thanks to the invention proposed here, in which the load on the axle 28 is significantly reduced in comparison to known adjusting devices, it is easily possible to manufacture the axle 28 and the main body 4 out of the same plastic.

The axle 28 has a diameter that varies along its axial direction. Starting from the main body 4, the axle 28 first has a larger outer diameter 28a and, as the distance from the main body 4 increases, the axle 28 has a smaller diameter 28c. In a transition region 28b, the larger outer diameter 28a transitions into the smaller outer diameter 28c. At the end oriented away from the main body 4, the axle 28 has an end 28d oriented toward the cover.

The drive gear 20 is supported on the axle 28 in rotary fashion. The gear 20 has a region with a larger inner diameter 20a and a region with a smaller inner diameter 20c (FIGS. 3, 5, and 7).

The gear 20 is supported in rotary fashion with the larger inner diameter 20a on the larger axle diameter 28a and with the smaller inner diameter 20c on the smaller axle diameter 28c. It is also possible to provide more than two different diameter steps so that starting from the main body 4, the axle 28 becomes thinner in more or less finely graduated steps, the inner diameters of the gear 20 being correspondingly adapted to at least selected diameters of the axle 28.

Figure 8:
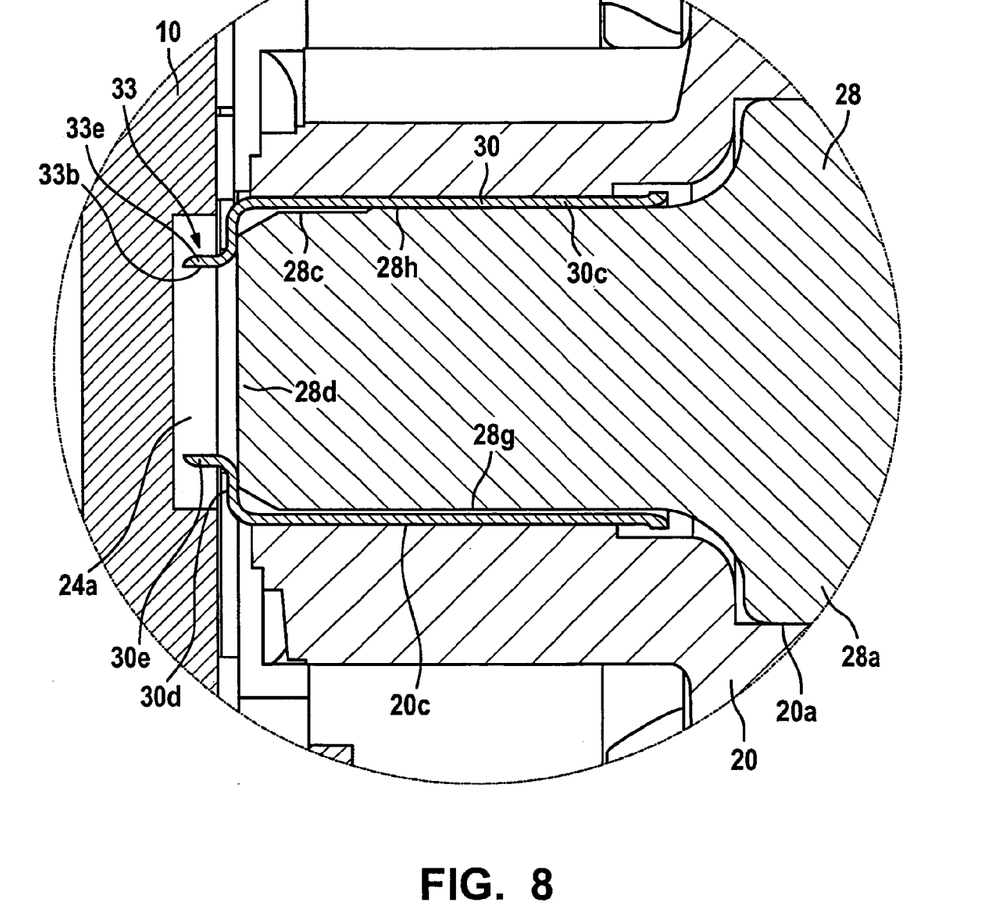
FIG. 8 shows a detail from FIG. 7.
Figure 9:
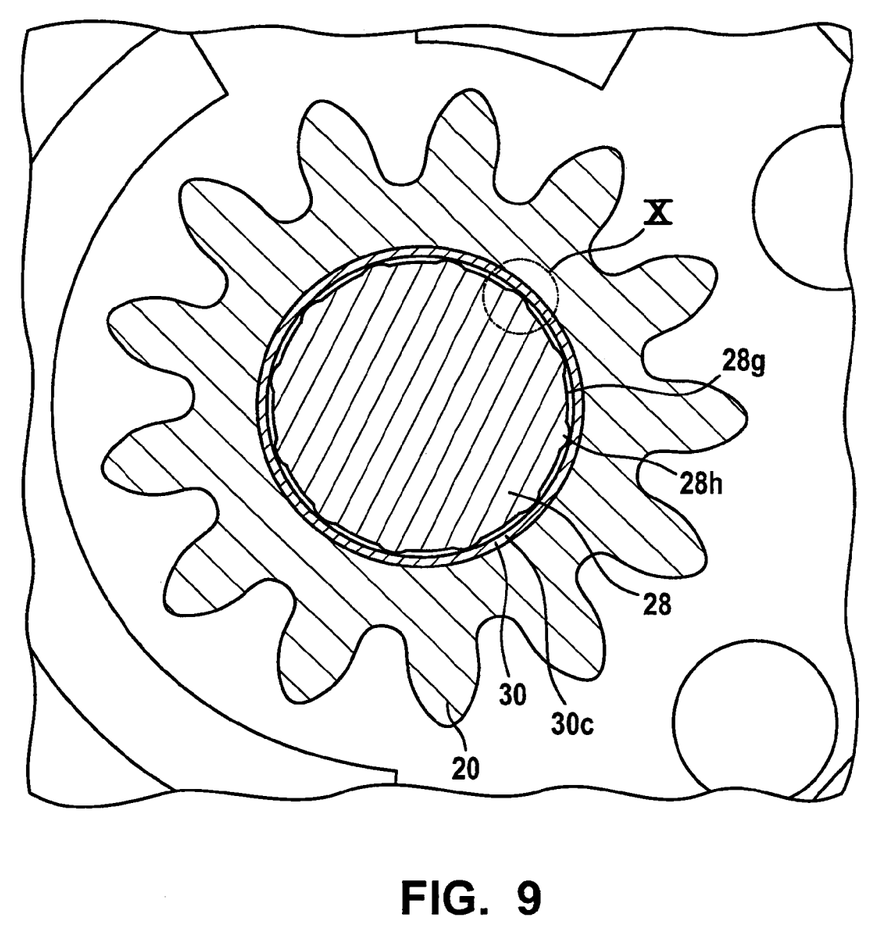
FIG. 9 shows a section through the gear, transversely in relation to the axle.

The axle 28 has a sleeve 30 mounted on it and enclosing the smaller axle diameter 28c. The sleeve 30 is press-fitted onto the axle 28 and protrudes in the axial direction beyond the cover end 28d of the axle 28. The sleeve 30 has a first region 30c which is press-fitted onto the smaller axle diameter 28c of the axle 28. At the point at which the sleeve 30 protrudes beyond the end 28d oriented toward the cover, the sleeve 30 has a diameter step 30d (FIG. 8). This is adjoined by a second region 30e with a reduced diameter. Starting from the diameter step 30d, the second region 30e of the sleeve 30 extends axially toward the cover 10. The sleeve 30 or at least the second region 30e of the sleeve 30 or at least the axially protruding edge of the second region 30e of the sleeve 30 is comprised of a relatively hard or hardened material and the second region 30e is relatively thin-walled and preferably tapers off to a point or blade shape at the end. When the cover 10 is being attached to the main body 4, the second region 30e of the sleeve 30 presses into the ribs 24a and 24b provided on the cover 10. As a result, the sleeve 30, together with the cover 10, constitutes a molding device 33. The second region 30e of the sleeve 30 functions as the stamping body 33e of the molding device 33 and the ribs 24a and 24b of the cover 10 function as a receiving region 33b for the stamping body 33e of the molding device 33.

The molding device 33 is embodied so that the relatively hard stamping body 33e pushes into the receptacle 33b as the cover 10 is being attached to the main body 4. Because the receptacle 33b is molded only as the cover 10 is being attached to the main body 4, an exact positioning occurs between the axle 28 and the cover 10, independent of dimensional tolerances of the cover 10 and/or main body 4.

The gear 20 has a larger gear rim 20g and a smaller gear rim 20k (FIGS. 2 and 7). The larger gear rim 20g meshes with the motor pinion 18 (FIG. 2) and the smaller gear rim 20k meshes with the driven gear 22. Depending on the torque to be transmitted, the gear 20 loads the axle 28 with a lateral force 35 transverse to the rotation axis 26. The direction of this lateral force 35 on the axle 28 is essentially perpendicular to the connecting line between the rotation axis 26 of the gear 20 and the rotation axis of the driven gear 22. The direction of the lateral force 35 also depends somewhat on the rotation axis of the motor pinion 18; this influence is relatively slight. FIG. 2 contains an arrow labeled with the reference numeral 35, which is intended to roughly indicate the direction of the lateral force 35. Depending on the rotation direction of the torque, the lateral force 35 can also be oriented in the direction opposite from that indicated by the arrow. The lateral force 35 is particularly powerful when the throttle valve flap 8 (FIG. 1) is being moved quickly and strikes against an end stop.

The ribs 24a and 24b on the cover 10 offer the advantage that the stamping body 33e of the molding device 33 does not have to dig into the cover 10 over the entire circumference of the second region 30e of the sleeve 30, but only over parts of the circumference of the second region 30e of the sleeve 30.

In lieu of the two ribs 24a and 24b, it is also possible for only one rib 24a to be provided. It is also possible, however, to provide three or more ribs. It is furthermore possible to make the cover 10 without ribs and to embody it so that the stamping body 33e on the axle 28 presses directly into the inside of the cover 10 oriented toward the transmission housing 12 and for the receptacle 33b of the molding device 33 to be embodied directly on the cover 10.

The at least one rib 24a or the ribs 24a and 24b are oriented so that they extend parallel to the direction of the lateral force 35 exerted on the axle 28 by the gear 20 (FIG. 2). The lengths of the ribs 24a and 24b are dimensioned so that the stamping body 33e comprised of the second region 30e of the sleeve 30 penetrates into two different places spaced apart from each other in each of the ribs 24a, 24b. As a result, the receptacle 33b in the ribs 24a and 24b extends transversely in relation to the lateral force 35 so that when the lateral force 35 occurs, this lateral force 35 can be optimally absorbed by the cover 10. A favorable hold between the cover 10 and the axle 28 is thus achieved with a relatively short receptacle 33b. The short receptacle 33b has the advantage that the stamping body 33e of the molding device 33 can push into the receptacle 33b with a relatively small amount of force.

Figure 10:
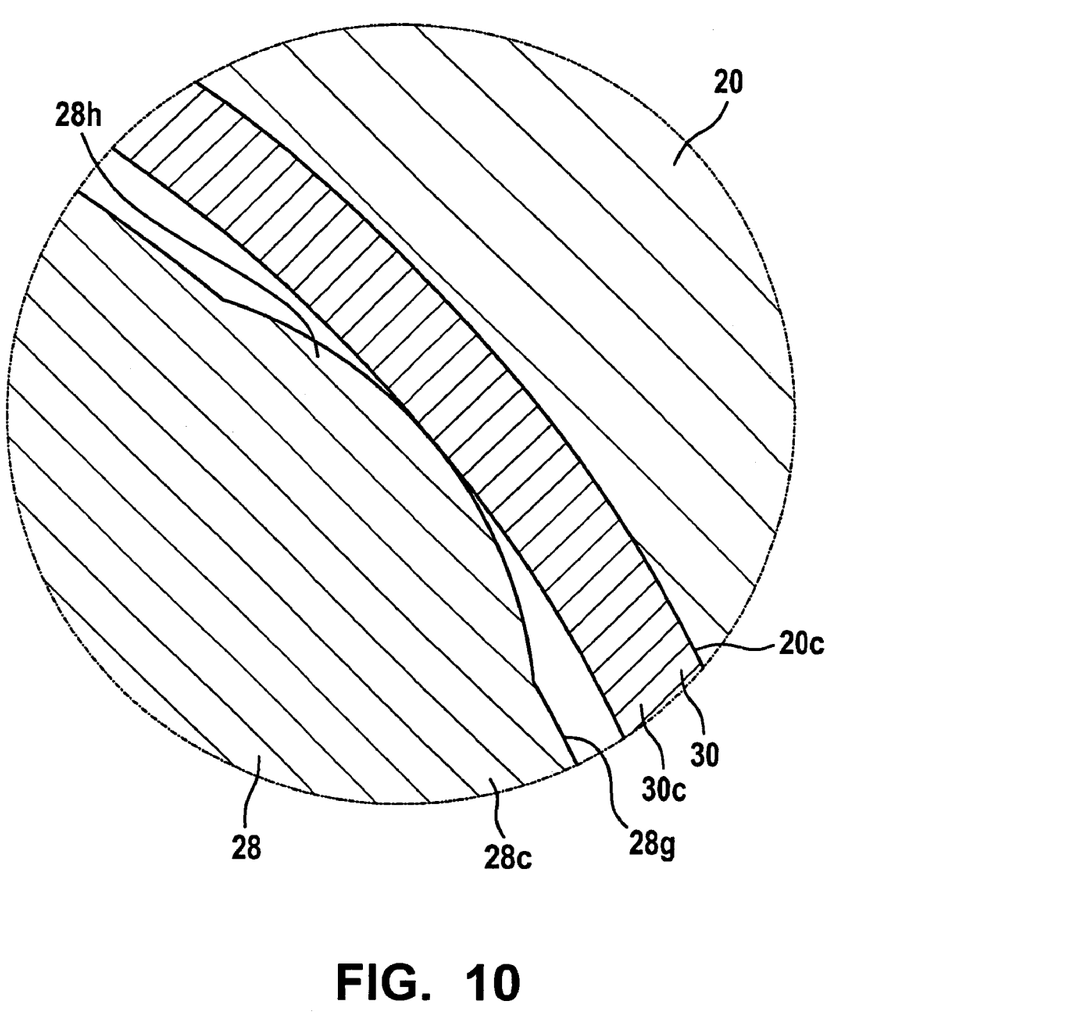
FIG. 10 shows a detail from FIG. 9.

At the point at which the sleeve 30 is press-fitted onto it, the axle 28 in the exemplary embodiment shown, i.e. with the smaller axle diameter 28c, has a main diameter 28g (FIGS. 8 and 10). At the circumference of the main diameter 28g, it has a raised area 28h or has several raised areas 28h distributed more or less uniformly over the circumference. Before the sleeve 30 is mounted onto it, the main diameter 28g with the raised areas 28h has a circumcircle. The circumcircle is the smallest possible circle into which the main diameter 28g with the raised areas 28h would fit without being pressed into it. It is recommended that the circumcircle of the main diameter 28g with the raised areas 28h be selected to be larger than the inner diameter of the region 30c of sleeve 30, but for the main diameter 28g without considering the raised areas 28h to be smaller than the inner diameter of the region 30c of the sleeve 30. As a result, the region 30c of the sleeve 30 can be press-fitted onto the axle 28 with a relatively small amount of force and with relatively little deformation to the material of the axle 28. When the sleeve 30 is being press-fitted onto the axle 28, only the tips in the region of the raised areas 28h must be slightly deformed. This offers the advantage that the axle 28 can be made of a material that has a relatively low subsequent deformability. Another advantage is that because of the raised areas 28h, the sleeve 30 is slightly deformed elastically so that an initial stress is generated that reliably secures the sleeve 30 to the axle 28.

In the region of the large gear rim 20g, the gear 20 rests with the larger inner diameter 20a against the larger axle diameter 28e of the axle 28 (FIGS. 5 and 7). The large gear rim 20g is quite large so that the larger axle diameter 28a can also be of relatively large dimensions. This offers the advantage that it is relatively easily for the axle 28 to absorb the load exerted on it by the lateral force 35.

In the region of the small gear rim 20k, the gear 20 rests with the smaller inner diameter 20c against the first region 30c of the sleeve 30 and thus indirectly against the smaller axle diameter 28c of the axle 28. The reduction of the diameter of the axle 28 in the transition region 28b advantageously permits the small gear rim 20k to be selected as quite small, thus permitting a high gear ratio to be achieved between the gear 20 and the driven gear 22 (FIG. 2).

In order to attain the highest possible gear ratio between the gear 20 and the driven gear 22, the small gear rim 20k of the gear 20 must be relatively small. Because the axle 28 has the smaller axle diameter 28c at a greater distance from the main body 4, the small gear rim 20k of the gear 20 can be kept quite small, which is desirable.

The molding device 33 between the axle 28 and the cover 10 achieves the advantage that the axle 28 is secured at one end directly by the main body 4 and is secured in an excellent fashion at the other end by the cover 10. The fact that the cover 10 is nondetachably fastened by the main body 4 results in a good support of the gear 20 on both sides on the axle 28 and therefore on the main body 4.

If the sleeve 30 only encompasses the small axle diameter 28c of the axle 28, then this offers the advantages of reduced tolerance problems and reduced forces required for press fitting the sleeve and also distributes the surface load on the axle 28 in the place where the load between the gear 20 and the axle 28 is particularly high, i.e. at the smaller axle diameter 28c.

The foregoing relates to preferred exemplary embodiments of the invention, it being understood that other variants and embodiments thereof are possible within the spirit and scope of the invention, the latter being defined by the appended claims.

We claim:

1. In an adjusting device for an internal combustion engine, the device having a main body, a transmission with at least one gear, and an axle connected to the main body and supporting the gear in rotary fashion, the improvement wherein the axle has a varying diameter, viewed in the axial direction, in the region in which the gear is supported.

2. The adjusting device according to claim 1, wherein the diameter of the axle gets smaller as the distance from the main body increases.

3. The adjusting device according to claim 2, wherein the diameter of the axle is stepped.

4. The adjusting device according to claim 2, further comprising a sleeve is provided between the axle and the gear at least in subregions of the support of the gear.

5. The adjusting device according to claim 1, wherein the diameter of the axle is stepped.

6. The adjusting device according to claim 5, further comprising a sleeve is provided between the axle and the gear at least in subregions of the support of the gear.

7. The adjusting device according to claim 1, further comprising a sleeve is provided between the axle and the gear at least in subregions of the support of the gear.

8. The adjusting device according to claim 7, wherein the sleeve is provided in the region of the smaller diameter of the axle.

9. The adjusting device according to claim 8, wherein the sleeve is press-fitted onto the axle.

10. The adjusting device according to claim 9, further comprising at least one raised area on the circumference of the axle, and wherein, before the press-fitting of the sleeve, the at least one raised area extends radially outward so that a circumcircle formed by it is greater than a corresponding inner diameter of a corresponding part of the sleeve.

11. The adjusting device according to claim 8, further comprising a molding device on the axle, which, through a molding process that occurs as a cover is being fastened to the main body, fixes at least regions of the axle in relation to the cover, at least in a transverse direction.

12. The adjusting device according to claim 7, wherein the sleeve is press-fitted onto the axle.

13. The adjusting device according to claim 12, further comprising at least one raised area on the circumference of the axle, and wherein, before the press-fitting of the sleeve, the at least one raised area extends radially outward so that a circumcircle formed by it is greater than a corresponding inner diameter of a corresponding part of the sleeve.

14. The adjusting device according to claim 13, further comprising a molding device on the axle, which, through a molding process that occurs as a cover is being fastened to the main body, fixes at least regions of the axle in relation to the cover, at least in a transverse direction.

15. The adjusting device according to claim 7, further comprising a molding device on the axle, which, through a molding process that occurs as a cover is being fastened to the main body, fixes at least regions of the axle in relation to the cover, at least in a transverse direction.

16. The adjusting device according to claim 1, further comprising a molding device on the axle, which, through a molding process that occurs as a cover is being fastened to the main body, fixes at least regions of the axle in relation to the cover, at least in a transverse direction.

17. The adjusting device according to claim 16, wherein the molding device is situated essentially at an end of the axle oriented toward the cover and the molding device fixes the cover end of the axle in relation to the cover.

18. The adjusting device according to claim 16, wherein the molding device has a relatively hard stamping body which is attached to the axle and engages the cover in a molding fashion as the cover is being fastened to the main body.

19. The adjusting device according to claim 17, wherein the molding device has a relatively hard stamping body which is attached to the axle and engages the cover in a molding fashion as the cover is being fastened to the main body.

20. The adjusting device according to claim 18, wherein the stamping body is comprised of the sleeve.

* * * * *